Patent header and first columns

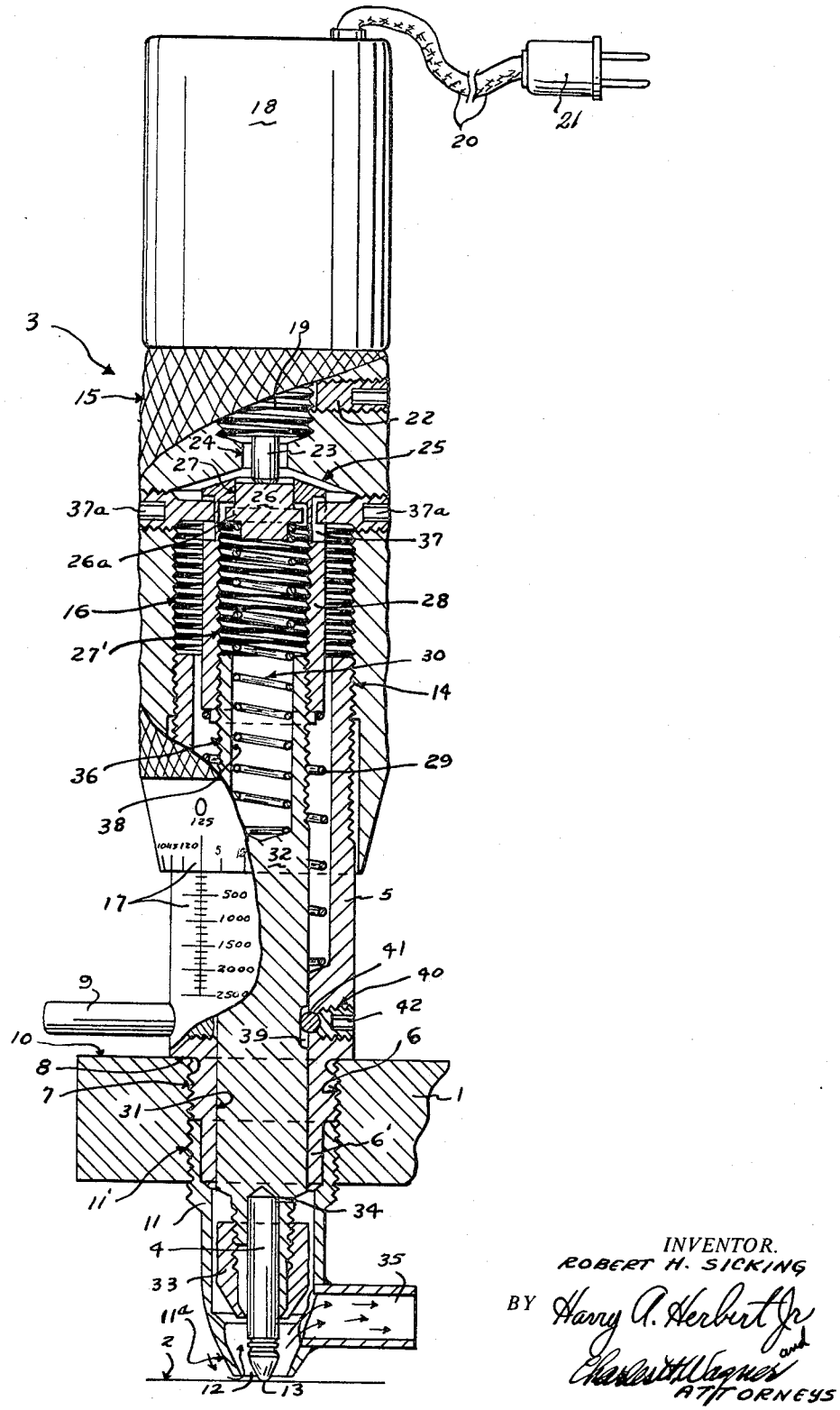

3,384,965
TOOLHOLDER FOR ENGRAVING POINTS
Robert H. Sicking, 5705 Itaska, St. Louis, Mo. 63109
Filed June 26, 1967, Ser. No. 649,437
8 Claims. (Cl. 33—18)

ABSTRACT OF THE DISCLOSURE

A data plotting machine engraving point holder has a hollow barrel which is secured to a toolholder mounting bracket of a data plotting machine which has a "push down" solenoid that is fixed on the upper end of an outer thimble that is axially adjustable by rotation of the thimble. The solenoid has a central plunger which is depressible downwardly when the solenoid is energized. A scribing toolholder chuck shaft is slidably mounted in a bore in the barrel and has a second or inner thimble which is axially adjustable thereon and is connected to the other thimble for simultaneous rotative adjustments to cause equal extensions or retractions in the axial lengths between the opposite outer ends of the barrel and the outer thimble, and between the opposite outer ends of chuck shaft and the inner thimble. A lifting coil spring is disposed between the barrel and the inner thimble, and a second plunger is slidably mounted in the upper end of the inner thimble for impingement and downward movement in that thimble by the solenoid plunger and includes a stop shoulder on the upper end of the inner thimble limiting upward movement of the second plunger in the inner thimble. A chuck shaft pressure adjusting spring is compressible in a bore in the chuck shaft between the second plunger and the bottom of the bore in the chuck shaft.

Background of the invention

The invention pertains to scriber or stylus toolholders, and not in the apparatus for moving the holder and engraving stylus or point, for instance, selectively or relatively along perpendicular X and Y coordinates. One form of scribing apparatus comprises a support of a so-called rigid scribing apparatus in which the coated transparent sheet to be engraved is selectively moved in one direction under the stylus or engraving point, for instance, at variable controlled rates, while the tool holder and its stylus or scribing point is selectively moved at various controlled rates in a direction perpendicular to the direction of movement of the coated transparent sheet and includes a solenoid or other means for selectively moving the stylus point vertically in the holder, into and out of scribing or engraving engagement with the coated surface of the transparent sheet which is being scribed or engraved.

The stylus holder chuck is vertically movable toward the coated sheet by a "down push" solenoid, with lift spring means to lift or retract the stylus off of the coated surface when the solenoid is deenergized. Sometimes spring means are provided to yieldably engage the stylus point with the coated surface as the point holder is moved down into its scribing position.

Field of the invention

The invention relates to improved toolholders for engraving stylus or scribing points for coated transparent sheets and the like, and comprises improvements in toolholders for the scribing points, such as described in the copending patent application Ser. No. 557,865 to R. H. Sicking and R. H. Sovar, entitled "Hollow Engraving Points, Holders, and Cleaning Device for Engraving Coated Sheets," filed June 13, 1966, now Patent No. 3,353,273, and copending patent application Ser. No. 384,049 to R. H. Sovar and R. H. Sicking, filed July 17, 1964, entitled "Hollow Engraving Point and Holder for Engraving Coated Transparent Sheets," now Patent No. 3,339,279, and has for an object the provision of means for coupling the stylus pressure spring adjustment thimble to the solenoid mount in such a way that a constant predetermined vertical height is always maintained between the collet chuck for the stylus point and the (coated) working surface during the scribing operation, for any predetermined adjustment of the stylus pressure spring, to obtain variations in the scribing point contact pressure.

A further object of the invention is the provision of means for maintaining the vertically movably chuck point supporting shaft for the scribing point in a non-rotative attitude and the provision of an outer thimble which is rotatable to vary the coated surface scribing contact pressure without disturbing the amount of elevation of the scribing point above the coated surface, when it is retracted therefrom.

A further object is the simplified fabrication of the scribing point toolholder which facilitates point changing by eliminating two operations in previously known constructions that were necessary to bring the scribing point into accessibility, and eliminate the previous drag on the solenoid plunger which created objectional pressure variations in fine line engravings, as well as the elimination of the pulling of debris through the collet chuck where it then often interfered with the desired setting of the point, also allowing for more accurate engraving by the elimination of errors caused by non-concentric points, while insuring accurate centering of the points, and making the collet chuck assembly more rigid.

A further object of the invention is the provision of means coupling the engraving pressure spring adjusting means to the actuating solenoid adjustment mounting outer thimble so that a constant predetermined vertical height is maintained between the chuck for the stylus point and the working surface for any adjusted engraving pressure, when the solenoid is deenergized.

A further object is the provision of a simplified vacuum cleaning and purging arrangement by the elimination of a mechanical coupling between the vertically movable plunger carrying the chuck and stylus and the vacuum supply line, by attaching the vacuum jacket for the engraving point directly to the plotting machine toolholder mounting bracket rather than to the vertically movable tool, or point holder or chuck, and maintaining the point holder shaft in a non-rotatable relation relative to the toolholder mount to thus permit easier and more convenient manipulation for removal and replacement of the stylus therein, and removal of the toolholder assembly from the engraving machine or apparatus.

A further object is the provision of micrometer adjusting means on the body of the toolholder for predetermined "fine" adjustments of the compression of the engraving pressure control spring without disturbing the elevation of the engraving stylus above the surface to be scribed, when the actuating solenoid is deenergized.

Other objects and advantages of the invention will become apparent from the following description and accompanying drawings.

*Brief description of the drawing*

The drawing is an enlarged side view of a toolholder for a scribing or engraving machine, showing in section a portion of the "fixed" mounting bracket of the engraving machine, for the toolholder assembly, also showing the toolholder incorporating the invention removably mounted in the fixed mounting bracket with a material portion of the exterior of the toolholder broken away and shown in section to show the interior structure thereof, and with the D.C. "down push" solenoid energized to depress the scribing point into yieldable scribing engagement with the coated surface of a transparent sheet to be scribed or engraved.

*Description of the preferred embodiment*

Referring to the drawing which illustrates, partly in section and partly in elevation, a typical embodiment of an improved toolholder incorporating the invention, the referenced numeral 1 denotes a fixed mounting bracket of a data plotting machine for scribing or engraving coated transparent sheets, films and the like indicated at 2. The "fixed" mounting bracket 1 is movable or relatively movable by the plotting machine (not shown) in the conventional manner above the coated plotting surface 2 in predetermined or selected transverse directions, for instance selectively along X and Y coordinates to shift or move the vertical or central axis of the toolholder, indicated generally at 3, over the coated surface in any controlled manner or direction. In some of the conventional plotting machines the coated sheet 2 is selectively moved in one direction while the toolholder 3 is moved selectively in the transverse direction so that the vertical axis of the toolholder 3 will follow the desired predetermined design, diagram, or lettering, as planned. In other conventional plotting machines the coated sheet is stationary and flat, and the toolholder is movably selective above the sheet in any direction, as seen in the pending patent application Ser. No. 384,049 to Sovar and Sicking, filed July 17, 1964. Of course, the toolholder 3 carries an engraving stylus point 4 which is selectively moved up and down into and out of scribing engagement with the coating during the relative transverse movements of the holder as desired.

Referring more specifically to the drawing, the toolholder 3 comprises a hollow cylindrical barrel 5 which has a threaded lower reduced end portion 6 and a still smaller diameter unthreaded portion 6'. The threaded portion 6 is screwed into and supported in a threaded bore 7 extending vertically through the mounting bracket 1. An annular shoulder 8 is found between the body of the barrel 5 and the threaded extension 6 and seats on the top surface 10 of the "fixed" mounting bracket 1. The barrel 5 has an arm or lever 9 which projects radially from the barrel 5 adjacent the top surface 10 of the bracket 1 for tightening the toolholder in the threaded bore or socket in the bracket 1 or loosening it for removal.

A vacuum jacket 11 is carried by the mounting bracket 1 having an enlarged threaded upper end 11' which is screwed in the mounting bracket threaded bore 7 and is securely fixed on the mounting bracket 1 in closely spaced predetermined relation above the coated surface 2, and is provided at its lower end with an inwardly and downwardly tapered conical end 11a, formed with a suction inlet opening 12 through which the scribing point 4 extends or projects. The scribing point 4 is cylindrical, having a conical lower end constituting a surface coating removing or scribing point or extremity 13.

The barrel 5 is cylindrical and is externally threaded at 14, and carries an outer adjustable thimble 15, which is rotatable and threaded internally at 16 for vertical adjustment on the barrel 5 above the bracket 1.

A micrometer adjustment scale or indicia, indicated at 17, is provided between the barrel 5 and the lower end of the thimble 15, the exterior of the thimble being suitably knurled for easy rotative adjustments thereof.

A D.C. "push down" type of solenoid 18, having a threaded neck 19 and circuit leads 20 which terminate in a plug 21, is normally attached to the automatic data plotter (not shown) in such a way as to receive an electric activating signal. The solenoid 18 is screwed into a threaded socket in the top of the outer thimble 15, by means of its threaded neck 19, and is further locked in place in the socket by means of a set screw 22 which impinges on the threaded neck 19.

An actuating solenoid plunger 23 extends downwardly through a central opening 24 in the outer thimble 15. An abutment surface 25 is disposed at the upper end of the threaded bore 16 in the outer thimble 15.

Upon receiving an actuating electric signal the solenoid plunger 23 is extended downwardly through the neck 19 to its maximum outward or downward position, as shown in the drawing.

The solenoid plunger 23, when projected, impinges upon another or scribing spring tensioning second plunger 26 which is axially movable in a guide bore or passage 27 in the top portion of an inner thimble 28 and tends to force this second plunger 26 downwardly. Downward movement of the second plunger 26 is resisted by a "lifting" coil spring 29 which bears against the bottom of the inner thimble 28, and also by a scribing pressure adjusting coil spring 30.

When the solenoid 18 is deenergized the inner or scribing pressure adjusting spring 30 forces the second or scribing spring tensioning plunger 26 upwardly, causing the annular flange 26a thereon to impinge the annular stop shoulder at the top of the enlarged threaded bore 27' of the inner thimble 28 while the outer lifting spring 29 forces the top of the inner thimble 28 into movement limiting engagement with the abutment surface 25 in the outer adjustable thimble 15.

The lower end of the barrel 5 has an axial bore or guide passage 31 therethrough in which a cylindrical chuck shaft 32 is slidably mounted having a collet chuck 33 on the lower end thereof for snugly receiving the cylindrical scribing point or stylus 4 therein, and is enclosed within the fixed vacuum jacket 11. A small vent passage is drilled in the upper end of the collet chuck socket, as indicated at 34, and the vacuum jacket 11 has a laterally extending suction tube 35 which is adapted to be connected by a flexible tubular conduit (not shown) to a suitable suction pump (not shown).

The upper exterior portion of the cylindrical chuck shaft 32 is threaded at 36 and is received in the threaded interior 27' of the inner thimble 28. The chuck shaft 32 has an axial spring receiving bore 38 in which the inner or scribing pressure adjusting coil spring 30 is mounted with the lower end thereof impinging the bottom of the bore 38, and the upper end impinging the lower portion of the spring tensioning plunger 26 to tension the plunger 26 upwardly.

The upper end of the inner thimble 28 is formed with diametrically opposite vertical slots 37 and the outer thimble 15 has opposite set screws 37a therein extending radially inward into the vertical slots 37 to couple the outer thimble 15 to the inner thimble 28, whereby rotative adjustment of the outer thimble 15 causes similar rotative adjustment of the inner thimble 28.

To prevent rotative movement of the chuck shaft 32 in the bore or guide passage 31 of the barrel 5 the chuck shaft 32 is formed with a short vertical slot 39 in its side and a threaded radial passage 40 is formed in the lower portion of the barrel 5 opposite the radial arm or lever 9 and a ball bearing 41 is disposed in the threaded radial passage 40 in engaging relation partly in the vertical slot 39. A set screw 42 is seated in the socket or passage 40 to engage the ball bearing 41, to hold the same in the slot 39.

The threads 36 and 27' between the chuck shaft 32 and the inner thimble 28 and the threads 14 and 16 between the outer surface of the barrel 5 and the inner threads of the outer thimble 15 are arranged in relative pitch so that the outer thimble 15 and the inner thimble 28 are moved axially together without varying the relation of the point 4 to the coated surface 2, other than to increase or decrease the downward scribing pressure of the spring 30 on the point 4, when the solenoid 18 is energized.

In other words, rotation of the outer thimble 15 also causes similar rotation of the inner thimble 28 through the aforementioned yoke arrangement 37–37a. The threads 37 of the inner thimble 28 and chuck shaft 32 correspond to the threads 16 and 14 on the outer thimble 15 and barrel 5.

The set screw 42, ball bearing 41, and vertical slot 39 arrangement in the barrel 5 and chuck shaft 32, prohibits the shaft 32 from rotating and thus rotation of the outer thimble 15 causes the inner thimble 28 to rotate in a like direction a like amount with respect to the non-rotating chuck shaft 32, which remains in the same vertical position relative to the working surface 2 throughout. Rotation of the thimbles 15 and 28 causes the inner one 28 to adjust the compression of the scribing point pressure adjusting coil spring 30. The more it is compressed the greater the force that will be applied to the engraving point 4 when the solenoid plunger 23 begins to depress the spring tensioning plunger 26 in the inner thimble 28, as previously described.

Of course, the force of the lifting spring 29 is changed by the rotative adjustment of the thimbles 15 and 28, but this is not material or important since the lifting spring 29 is always sufficient to lift the inner thimble 28 (and chuck shaft 32) to retract the scribing stylus 4 upwardly the same amount, to impinge the upper end of the inner thimble 28 against the abutment surface 25 of the outer thimble 15 when the plunger 23 is retracted by deenergization of the solenoid 18. The scribing pressure spring 30, of course, always exerts a lifting pressure on the spring tensioning plunger 25 to move the same outwardly to its limit in the passage 27, when the solenoid 18 is deenergized.

The purpose of the radial lever or arm 9 is to facilitate removal and reinsertion of the toolholder and all mechanisms therewith attached by unscrewing it where it is threaded into the supporting bracket 1 of the plotter, for the purpose of changing engraving points 4, and resisting rotation of the barrel 5 in the supporting bracket 1 when the outer thimble 15 is manually rotated to adjust or change the scribing pressure of the spring 30.

However, the lever arm 9 may be replaced by lengthening the barrel and its other elements and knurling its outer surface between the micrometer scale elements 17 and the mounting bracket 1, so that it may be screwed in and out, and held, using finger pressure only, or by making the lower portion square or hexagonal rather than round and thus suitable for using an accessory wrench.

As before mentioned the modified vacuum jacket 11 is fixedly, but removably mounted on the support bracket 1 of the plotter so that it remains in fixed predetermined position above the coated surface when the toolholder 3 is unscrewed and removed making it unnecessary to disturb the jacket while changing points 4.

The collet chuck 33 is somewhat conventional, except that its cylindrical bore is machined to very close tolerance to closely fit a standard dimensioned engraving point such as 4, and the bore has the small transverse vent opening 34 at its upper end to release trapped air when inserting the point 4 and thus assures positive sealing of the point "all the way in." The "split" portion of the chuck consists of three narrow slots spaced 120° apart around the circumference of the cylindrical bore. The outer lower portion of the chuck is machined to a very close fit in the corresponding bore of the collar so that it and the collar and the stylus point are virtually a solid unit, even before the collar is drawn up tight. This eliminates any tendency for the chuck and the point to deflect sideways in operation, and drawing the collar up tight by screwing brings its lower inner edge into contact with the beveled portion of the chuck causing it to squeeze and lock the point in place, in the manner of a conventional collet.

The micrometer scale indicia 17 is to denote scribing pressure of the point 4 on the coating surface of the transparent sheet, for instance, it may denote "grams" of pressure.

For purposes of exemplification a particular embodiment of the invention has been shown and described to the best understanding thereof. However, it will be apparent that changes and modifications in the arrangement and construction of the parts thereof may be resorted to without departing from the true spirit and scope of the invention as defined in the accompanying claims.

I claim:

1. A stylus point scribing toolholder comprising, an elongated cylindrical barrel adapted to be fixedly mounted in vertical position on a fixed horizontal toolholder supporting bracket of a transparent opaque coated sheet scribing machine in predetermined spaced relation above the coated surface of an opaque coated transparent sheet to be scribed, said barrel having a chuck shaft guide bore extending axially therethrough, a stylus holding chuck shaft axially movable in said bore for vertical movements toward and away from the coated transparent sheet, a stylus scribing point holding collet chuck fixed on the lower end of said chuck shaft having a cylindrical stylus socket for removably receiving a cylindrical stylus scribing point therein, interengaging means between said chuck shaft and said barrel to prevent relative rotative movement therebetween, an elongated cylindrical outer thimble axially rotatable on the upper end of said barrel for predetermined axial adjustments thereof on said barrel, said chuck shaft having an axial scribing pressure spring receiving bore therein extending downwardly for a predetermined distance from its upper end, a scribing pressure spring adjusting inner thimble rotatably mounted on the upper end portion of said chuck shaft for predetermined relative axial adjustments thereof on said chuck shaft thimble, interengaging means between said outer thimble and said inner thimble to effect simultaneous identical rotative movement therebetween during rotative adjustment of said outer thimble on said barrel to provide identical axial adjustments of the inner and outer thimbles on the barrel, a chuck shaft lifting spring disposed within said outer thimble, in a downwardly extending lifting spring receiving bore formed in said barrel, said lifting spring having an upper end impinging the lower end of said inner thimble with its lower end impinging the bottom of the lifting spring receiving bore for exerting upward lifting pressure of said inner thimble and chuck shaft, fixed abutment means in said outer thimble in the path of upward movement of said inner thimble to limit upward movement thereof and said chuck shaft by said lifting spring, a scribing pressure spring tensioning plunger slidably mounted for vertical movement in the upper end of said inner thimble for axial movement thereof toward the bottom of said scribing pressure spring receiving bore, abutment means between said scribing pressure spring tensioning plunger and the upper end of said inner thimble for limiting upward movement only of said scribing spring pressure tensioning plunger in said inner thimble, a "push down" solenoid removably fixed on the upper end of said outer thimble having a solenoid plunger extending downward for impingement on said scribing pressure spring tensioning plunger to move that plunger downwardly in said inner thimble to compress said scribing spring pressure control spring and tension the inner thimble lifting spring and chuck shaft downwardly in said barrel to move said stylus scribing point downwardly into predetermined yieldable scribing engagement with the coated surface of a transparent sheet to be scribed thereby located at fixed predetermined distance below the fixed supporting bracket, when the solenoid is energized.

2. A stylus point scribing toolholder as claimed in claim 1 in which the outer thimble is threaded on the outer surface of the upper portion of the barrel, and the inner thimble is similarly threaded on the outer surface of the upper end portion of the chuck shaft to cause identical axial movements of the outer thimble on the barrel and inner thimble on the chuck shaft for predetermined rotative adjustments of the outer thimble on the barrel, to adjust the tension of the scribing pressure spring on the chuck shaft by rotation of the outer thimble without disturbing impinging relation of the solenoid plunger on the scribing pressure spring tensioning plunger, when the solenoid is energized.

3. Apparatus as set forth in claim 2 including abutment means on the barrel for engagement with the upper surface of the toolholder fixed mounting and supporting bracket for fixing the position of the barrel in predetermined spaced relation above the surface of a coated transparent sheet to be scribed by a stylus point fixed at the lower end of the chuck shaft.

4. A stylus point scribing toolholder as set forth in claim 3 including a collet chuck mounted on the lower end portion of said chuck shaft having a cylindrical stylus point receiving socket therein for receiving and fixing a cylindrical stylus scribing point therein in predetermined axial and concentric relation to the chuck shaft, said collet chuck having a maximum diameter not exceeding the diameter of the chuck shaft.

5. A stylus scribing toolholder as set forth in claim 4 including a vacuum jacket removably fixed on said mounting bracket and extending downwardly, enclosing said collet chuck, having a suction inlet port concentrically formed in the lower end thereof in fixed spaced relation above the surface of the coated transparent sheet, and concentrically surrounding said collet chuck and the scribing stylus point, whereby the toolholder is removable upwardly from the fixed supporting bracket without disturbing the relation between the vacuum jacket, coated surface, and the fixed mounting bracket, said vacuum jacket having a lateral suction outlet port therefrom adapted to be connected to the suction means.

6. A scribing toolholder comprising a cylindrical barrel having a concentric smaller diameter threaded lower extension adapted to be threaded into a vertical threaded bore of a fixed mounting bracket of an opaque coated transparent sheet scribing apparatus, said barrel having a cylindrical guide passage through the lower portion thereof and a concentric larger "lift spring" receiving cylindrical bore extending upwardly therein through the upper end thereof, said barrel having its outer periphery threaded downwardly from its upper end, a cylindrical chuck shaft slidably disposed in said guide passage and extending downwardly below the lower end of said barrel, a stylus point receiving collet chuck disposed on the lower end of said shaft having a concentric scribing stylus receiving socket for snugly fixing a scribing stylus therein, said chuck shaft having an inner concentric scribing pressure spring receiving bore therein extending downwardly a predetermined distance from its upper end, and formed with an outer threaded periphery extending downwardly from its upper end, a spring tension adjusting outer cylindrical thimble surrounding the upper end of said barrel having an inner threaded bore threadably engaging the threads on the upper portion of said barrel for predetermined axial movement thereof on the barrel incident to predetermined rotative adjustments of said outer thimble on said barrel, said outer thimble having an abutment wall in its threaded bore adjacent its upper end formed with a concentric solenoid plunger receiving passage extending upwardly through said abutment wall, said thimble having a concentric threaded solenoid mounting socket extending downwardly in its upper end to said abutment wall, a D.C. push down type solenoid fixed on the upper end of said thimble having concentric threaded extension threaded into said solenoid mounting socket, said solenoid having an actuating plunger extending downwardly in said plunger receiving passage, projected downwardly a predetermined distance when said solenoid is energized, an inner cylindrical spring adjusting thimble having an annular threaded inner surface extending upward from the bottom thereof threadably engaging the threaded periphery of said chuck shaft for predetermined axial adjustment thereof on said chuck shaft by predetermined rotative adjustments of said inner thimble on said chuck shaft, said inner thimble having a smaller concentric plunger receiving guide passage in the upper end for receiving the solenoid plunger therethrough, and formed with an annular stylus spring tensioning plunger abutment surrounding said last mentioned passage facing downwardly, a stylus spring tensioning plunger slidably disposed in said last mentioned passage having an annular abutment thereon for impingement with said plunger abutment to limit relative upward movement of said spring tensioning plunger in said last mentioned passage, said inner thimble having an elongated vertical slot in the outer surface of the upper end thereof, a pin projecting inwardly from the inner surface at the upper end of the threaded bore of said outer thimble into said vertical slot for interlocking said inner thimble to said outer thimble for simultaneous rotative adjustment of said inner thimble by similar rotative adjustment of said outer thimble, said chuck shaft having a longitudinal slot in the outer surface thereof intermediate the bottom of inner bore therein and said collet chuck, interengaging means projecting inwardly from said barrel into the last mentioned slot to prevent relative rotation of said chuck shaft in said barrel, a lifting coil spring within said barrel surrounding said chuck shaft having a bottom end impinging the bottom of said bore in said barrel and its upper end impinging the lower end of said inner thimble for urging said inner thimble upwardly to impinge the upper end of the inner thimble into movement limiting engagement with the abutment surface in said thimble, when said solenoid is deenergized, a scribing pressure adjusting lighter coil spring disposed within the inner thimble and said pressure adjusting spring receiving bore in said chuck shaft, having a lower end impinging the bottom of the chuck shaft bore and its upper end impinging the bottom of said spring adjusting plunger for compressing said last mentioned spring to yieldably move said chuck shaft downwardly to move a stylus point, when inserted in said collet chuck, into yieldable scribing engagement with the coated transparent sheet, when the solenoid is energized.

7. A data plotting machine engraving point holder comprising a hollow barrel adapted to be fixed in vertical position in a toolholder mounting bracket of a data plotting machine, an outer thimble axially adjustable by rotation thereof on said barrel, a "push down" solenoid fixed on the upper end of said outer thimble having a central plunger depressible downwardly when the solenoid is energized, a scribing toolholder chuck shaft slidably mounted in a central bore in said barrel, an inner thimble axially adjustable on said chuck shaft by rotative adjustment thereof, connecting means between said outer and inner thimbles connected for simultaneous identical rotative adjustments thereof to provide identical axial adjustments of the outer and the inner thimbles respectively on said barrel and on said chuck shaft, a "lifting" spring operable between said barrel and said inner thimble, a second stylus scribing spring tennsioning plunger slidably mounted in the upper end of the inner thimble for impingement and downward movement therein by said solenoid plunger, when energized, a stop shoulder in said inner thimble limiting relative upward movement of said second plunger in said inner thimble, when the solenoid is de-energized, a chuck shaft scribing pressure adjusting coil spring in a central bore in said chuck shaft compressible in said last bore between said second plunger and the bottom of said bore in said chuck shaft.

8. Apparatus as set forth in claim 7 including a vacuum jacket adapted to be fixed in the toolholder mounting bracket below said barrel surrounding the lower end of the chuck shaft and a scribing stylus at the end of the chuck shaft, formed with a cylindrical socket at the upper end for removably receiving the lower end of said barrel therein to permit removal of said toolholder from said mounting bracket without disturbing the position of said vacuum jacket on said bracket.

References Cited
UNITED STATES PATENTS

| | | | |
|---|---|---|---|
| 2,810,960 | 10/1957 | Johnson et al. | 33—18 |
| 2,902,760 | 9/1959 | Koenig | 33—18 |
| 3,158,936 | 12/1964 | Virta | 33—18 |

HARRY N. HAROIAN, *Primary Examiner.*